Figure 1:
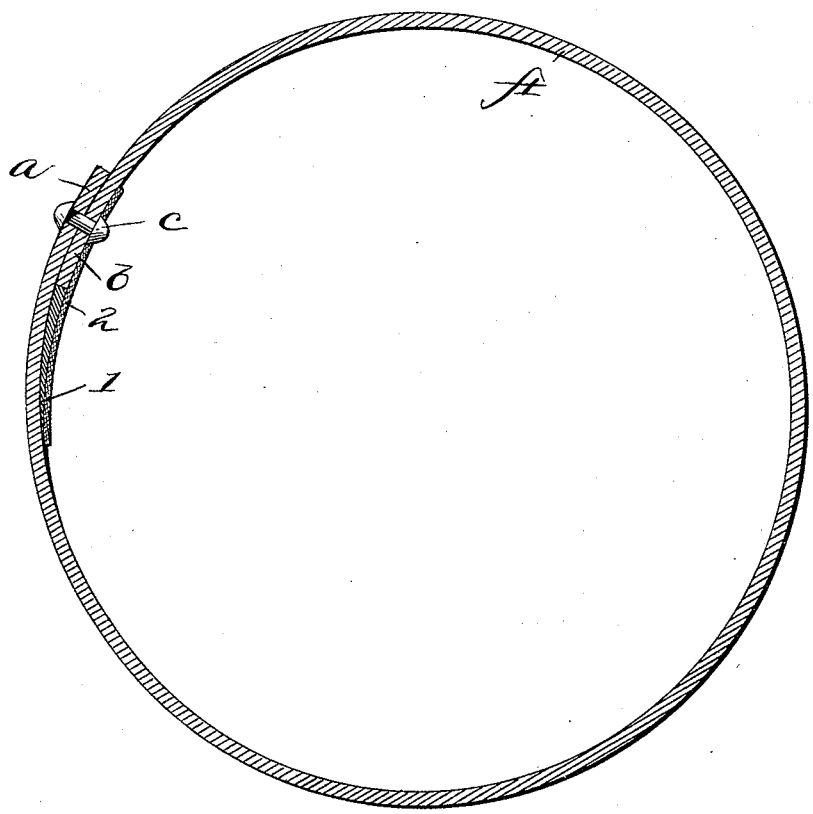

(No Model.)

A. WILBUR.
PIPE JOINT.

No. 441,525. Patented Nov. 25, 1890.

Witnesses
W. P. Keene.
F. L. Middleton

Inventor
Alfred Wilbur,
by Ellis Spear
Atty

UNITED STATES PATENT OFFICE.

ALFRED WILBUR, OF ALLEGHENY, ASSIGNOR OF ONE-HALF TO BENJAMIN H. LIGHTFOOT, OF PITTSBURG, PENNSYLVANIA.

PIPE-JOINT.

SPECIFICATION forming part of Letters Patent No. 441,525, dated November 25, 1890.

Application filed March 27, 1890. Serial No. 345,548. (No model.)

*To all whom it may concern:*

Be it known that I, ALFRED WILBUR, of Allegheny, in the county of Allegheny and State of Pennsylvania, have invented a new and useful Improvement in Pipe-Joints; and I do hereby declare that the following is a full, clear, and exact description of the same.

The object of my invention is to provide means for making a tight joint in pipes of large size composed of steel or iron plate where the joint is formed by lapping the parts together.

The invention is also equally well adapted to attain the same object when used in connection with joints made circumferentially instead of lengthwise of the pipe. Heretofore these joints have been calked by means of lead interposed between the laps, but it has been found that such a joint is not absolutely tight, and as the lead is liable to spread unevenly there is danger of holes being formed, thus causing leaks.

My invention consists in making the pipe in the ordinary way with the laps in contact and riveted, and in laying along the edge of the inner lap a fillet of suitable material, and in securing this fillet in place by means of a strip of gum cloth or like material held in place by an adhesive substance, such as pitch or cement.

In the drawing illustrating my invention the figure shows a sectional view of the metal pipe in which the lap is lengthwise thereof.

The pipe is represented at A, and is of that class which is usually composed of steel or iron plate and used for gas, and it is very desirable that the joint formed by the laps shall be gas-tight. I aim to attain this end in a simple manner, with but little cost, so as not to add to the weight of the finished pipe. I have shown in the drawing a pipe with a longitudinal joint, but it will be understood that the invention may be applied to a joint formed by overlapping sections. The overlap is shown at *a* and the underlap at *b*, the line of rivets being shown at *c*. Against the edge of the underlap I lay a fillet of suitable material—such as tarred cord or other suitable material—which may first be immersed in hot pitch or cement and then packed closely against the edge of the underlap, preferably being rounded off to conform to the interior surface of the pipe, and tapering off, as shown, at the point 1. After this is in place I coat the surface of the fillet and a portion of the interior surface of the pipe on either side of the fillet with hot pitch or cement, and on the adhesive surface thus formed I lay a strip of gum cloth or equivalent material 2, this strip being of such width as to cover the fillet entirely and to extend beyond the line of the rivets, as shown. This strip may have openings cut into it so as to fit snugly around the rivet-head. This will form a perfectly tight joint without calking, and the pressure of the gas will constantly tend to increase rather than diminish the tightness of the joint. The gum cloth may afterward be coated with cement or with pitch, and if found necessary a second strip may be applied to the first, though I do not apprehend that this will be found necessary.

In order to protect the seam formed as above described from action of the sun when the pipes are exposed, or before they are placed in position, I provide a covering similar to the others or of any suitable material, and use an adhesive mixture of glue or other material of like nature not affected by the heat. Instead of a flexible covering I may use a sheet of tin or other material.

I claim as my invention—

1. In combination with a pipe having a joint formed by lapping, a fillet applied to the edge of the underlap, and means for holding the fillet in place, substantially as described.

2. In combination with a pipe having a lap-joint, a fillet applied to the end of the underlap, and an impervious strip covering the fillet and held in place by an adhesive substance, substantially as described.

In testimony whereof I have signed my name to this specification in the presence of two subscribing witnesses.

ALFRED WILBUR.

Witnesses:
G. A. HILLEMANN,
W. T. MCCULLOUGH.